March 15, 1927. 1,620,849
J. T. WILLIAMS
GEARING
Filed July 14, 1925 2 Sheets-Sheet 1
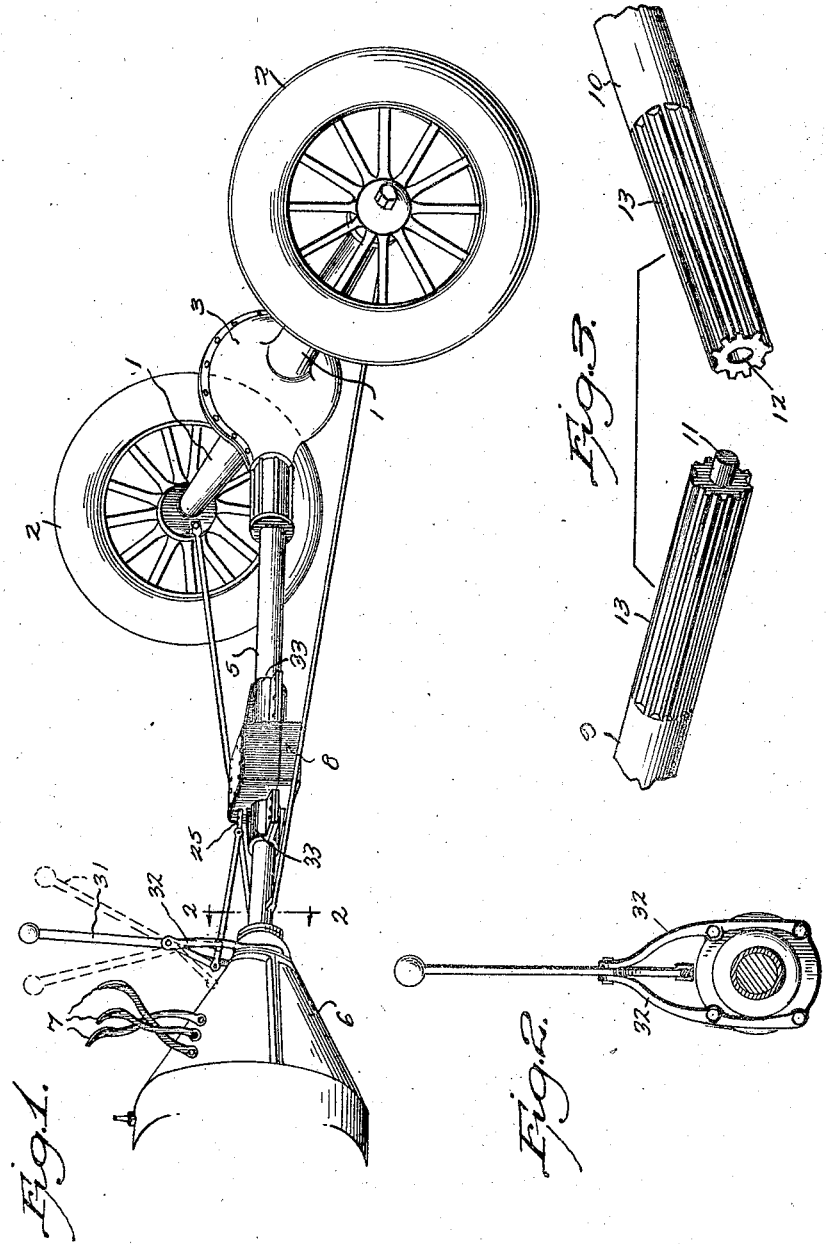
Inventor
JAMES T. WILLIAMS
By
Attorney March 15, 1927. 1,620,849
J. T. WILLIAMS
GEARING
Filed July 14, 1925  2 Sheets-Sheet 2

Inventor
JAMES T. WILLIAMS

Attorney

Patented Mar. 15, 1927.

1,620,849

UNITED STATES PATENT OFFICE.

JAMES TETTER WILLIAMS, OF MIAMI, MISSOURI.

GEARING.

Application filed July 14, 1925. Serial No. 43,570.

This invention relates to gearing and more particularly to an auxiliary transmission gearing for motor vehicles having transmission gearing of the planetary type.

An object of the invention is to provide auxiliary transmission gearing adapted to be arranged on the main shaft in which the main shaft now forming a part of the automobile may be employed.

In assembling the transmission gearing on the vehicle, the drive shaft is cut in two and an object of the present invention is the provision of means for alining the abutting ends of the two sections of the shaft.

A further object of the invention is to provide a construction in which a transmission shaft is arranged on each side of the main shaft to reduce the torque produced in similar constructions in which a single transmission shaft on one side of the drive shaft is employed.

Figure 4:
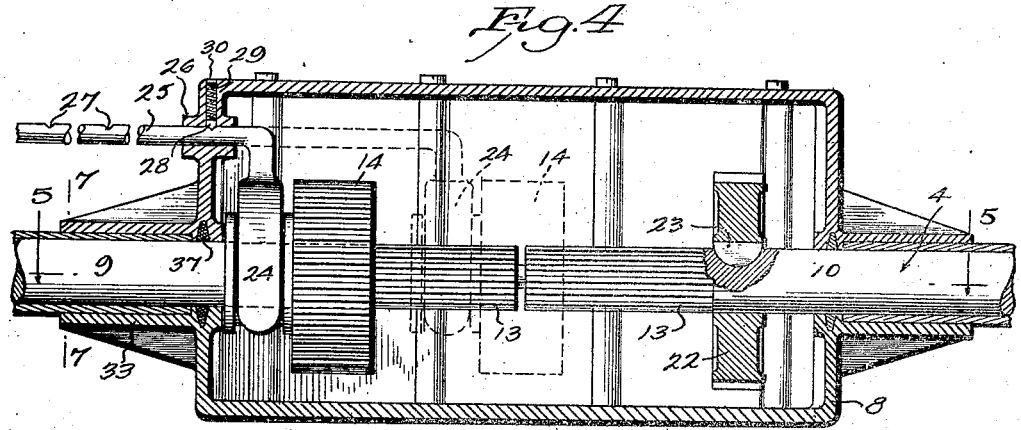
Figure 5:
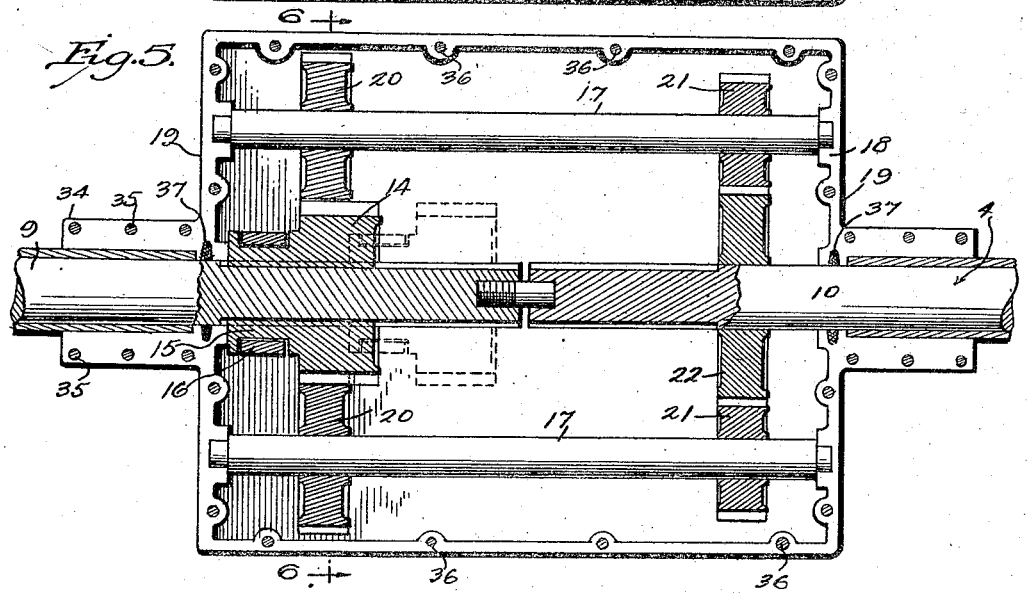
Figure 6:
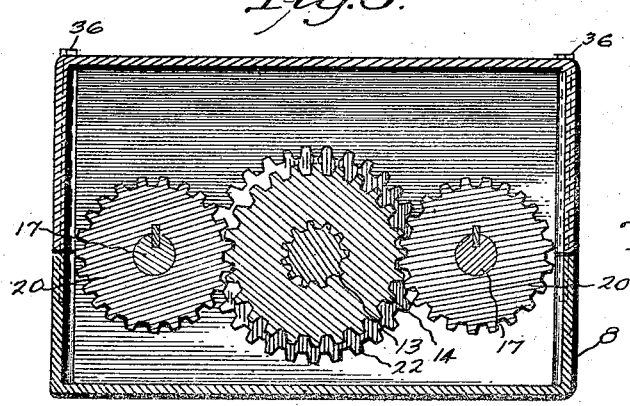
Figure 7:
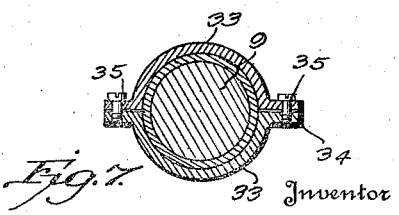

In the accompanying drawings, I have shown one embodiment of the invention. In this showing:

Figure 1 is a perspective view of a portion of the chassis of a motor vehicle showing the invention applied, Figure 2 is a vertical sectional view substantially on line 2—2 of Figure 1, Figure 3 is a perspective view of the abutting ends of the drive shaft after it has been altered for use in connection with the transmission forming the subject matter of the present invention, Figure 4 is a vertical longitudinal sectional view through the transmission showing the movable gear in second speed and, showing in dotted lines, the position of the movable gear in high speed, Figure 5 is a horizontal sectional view substantially on line 5—5 of Figure 4, showing the movable gear in second speed, and showing, in dotted lines, the position of the movable gear in neutral, Figure 6 is a vertical sectional view on line 6—6 of Figure 5, and, Figure 7 is a similar view on line 7—7 of Figure 4.

Referring to the drawings, the reference numeral 1 designates the rear axle of a motor vehicle having axle sections (not shown) arranged therein and operatively connected to the rear wheels 2 of the vehicle. At the center of the axle housing, there is provided the usual differential gearing housing 3. The vehicle is provided with the usual drive shaft 4 mounted in a housing or tube 5 and extending from a transmission casing 6 to the differential casing. The transmission is of the planetary type and of the usual construction, being controlled by means of pedals 7 which project through the floor of the vehicle (not shown) in proximity to the driver's seat.

The auxiliary transmission forming the subject matter of the present invention is arranged in a casing 8, disposed between the front and rear of the drive shaft. As shown, the drive shaft is divided into two sections (see Figures 3, 4, and 5), the forward section 9 being connected to the transmission in the usual manner and the rear section 10 being connected to the differential in the usual manner. The forward section is provided with a threaded bore in its rear end for the reception of a center plug 11 and the end of this plug is adapted to be received in a bore 12 in the forward end of the rear section to maintain the sections of the shaft in alinement. As shown, the adjacent ends of the shaft sections are provided with a plurality of grooves 13. A movable gear 14 is arranged on the drive shaft, the gear being provided with alternating grooves and projections to receive the alternating grooves 13 and projections formed on the drive shaft to permit longitudinal movement of the gearing 14 on the shaft and prevent relative rotational movement of the gear and the shaft. As shown, the forward end of the gear is provided with a hub 15 having a groove 16 formed therein. A transmission shaft 17 is arranged on each side of the drive shaft, the transmission shafts being mounted in suitable bearings 18 in the end walls 19 of the transmission casing. Adjacent the forward end, each of the transmission shafts is provided with a gear 20 which is keyed thereto to revolve therewith and which is adapted to mesh with the movable gear 14 when it is in the forward position shown in full lines in Figures 4 to 6 of the drawings. Adjacent the rear end of each of the transmission shafts, there is provided a gear or pinion 21 keyed thereto to revolve therewith and meshing with a drive gear 22 carried by the rear section 10 of the main shaft and secured thereto by means of a key 23.

The movable gear is adapted to be adjusted longitudinally of the main shaft by means of a yoke 24, the arms of which are received in the groove 16. This yoke is carried by a transmission lever 25 which passes through an opening in a boss 26 formed in the front wall of the transmission casing. As shown, the lever 25 is provided with spaced depressions 27 adapted to receive a locking member 28 which is normally forced downwardly by means of a spring 29 mounted in an opening in the end wall 19 and retained in position by means of a plug 30.

The forward end of the transmission lever 25 is connected to a hand lever 31 which is pivotally mounted in a pair of arms 32 secured to the main transmission housing. This transmission lever 31 is adapted to be arranged in either of three positions, as shown in Figure 1 of the drawings, to position the movable gear in either the full line position shown in Figures 4 and 5 of the drawings or the dotted line positions shown in the figures. At each end of the auxiliary transmission casing, I provide a clamping member consisting of a pair of semi-circular members 33 adapted to surround the drive shaft housing 5 and provided with flanges 34 at each side to receive bolts 35 by means of which the sections are secured to each other. As shown, these clamping sections are formed integral with the upper and lower sections of the transmission casing (see Figure 5) and at spaced intervals, the sections of the transmission casing are secured to each other by means of bolts 36. This construction prevents the transmission casing from moving around the shaft as an axis. At the point where the sections of the shaft pass through the end walls of the auxiliary transmission housing, I provide suitable packing 37 to prevent the loss of the lubricant employed in the transmission housing.

In operation, the vehicle may be driven in the ordinary manner with the auxiliary transmission arranged in high gear. This is accomplished by moving the lever 31 to the forward dotted line position shown in Figure 1 of the drawings, which positions the movable gear 34 over the adjacent ends of the sections of the main shaft, as shown in dotted lines in Figure 4 of the drawings. The gear thus couples the sections of the shaft to each other to form a direct drive. Particular attention is called to the fact that when in high gear, the lever 31 is arranged in its foremost position and is thus out of the way of the driver. To place the auxiliary transmission in neutral and thus disconnect the rear axle from the drive, the lever 31 is moved rearwardly to the full line position shown in Figure 1 of the drawings, moving the gear 14 to the dotted line position shown in Figure 5 of the drawings, and thus disconnecting the rear axle from the source of power. Further rearward movement of the lever 31 to the rear dotted line position shown in Figure 1 of the drawings moves the gear 14 to the full line position shown in Figures 4 to 6 of the drawings in mesh with the pinions 20 and thus couples the forward section 9 of the shaft to the rear section through the transmission shafts 17, pinion 21, and gear 22. Any desired arrangement of teeth on the gears and pinions may be employed for the purpose of obtaining a desired speed reduction.

The transmission lever 27 is locked in an adjusted position to prevent accidental movement by the locking member 28 which is received in the depressions 27. The spring 29 retains the locking member in position with sufficient force to prevent accidental displacement but may be readily overcome when the transmission is actuated manually.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

In a device of the character described, an automobile drive shaft divided into front and rear sections connected to the transmission gearing and the differential gearing respectively, the adjacent ends of said sections being provided with longitudinally extending ribs and grooves, a longitudinally movable gear mounted on said shaft, said gear being provided with an opening having longitudinally extending ribs and grooves to permit relative longitudinal movement of said gear with respect to said shaft and prevent relative rotation, a transmission shaft mounted on each side of said drive shaft, a gear mounted on the rear section of said drive shaft, gears mounted on said transmission shafts and meshing therewith, a gear mounted on each of said transmission shafts in alinement with the forward section of said drive shaft, said movable gear being adapted to span the adjacent ends of the shaft sections when in one position to couple them to each other, and means for moving said movable gear into mesh with said last mentioned gears to connect the front section of said drive shaft to the rear section through said transmission shafts.

In testimony whereof, I affix my signature.

JAMES T. WILLIAMS.